March 3, 1964   N. CORDIS   3,123,049
TROUGH FEEDER WITH RECIPROCATING IMPELLER
Filed May 31, 1961   2 Sheets-Sheet 1
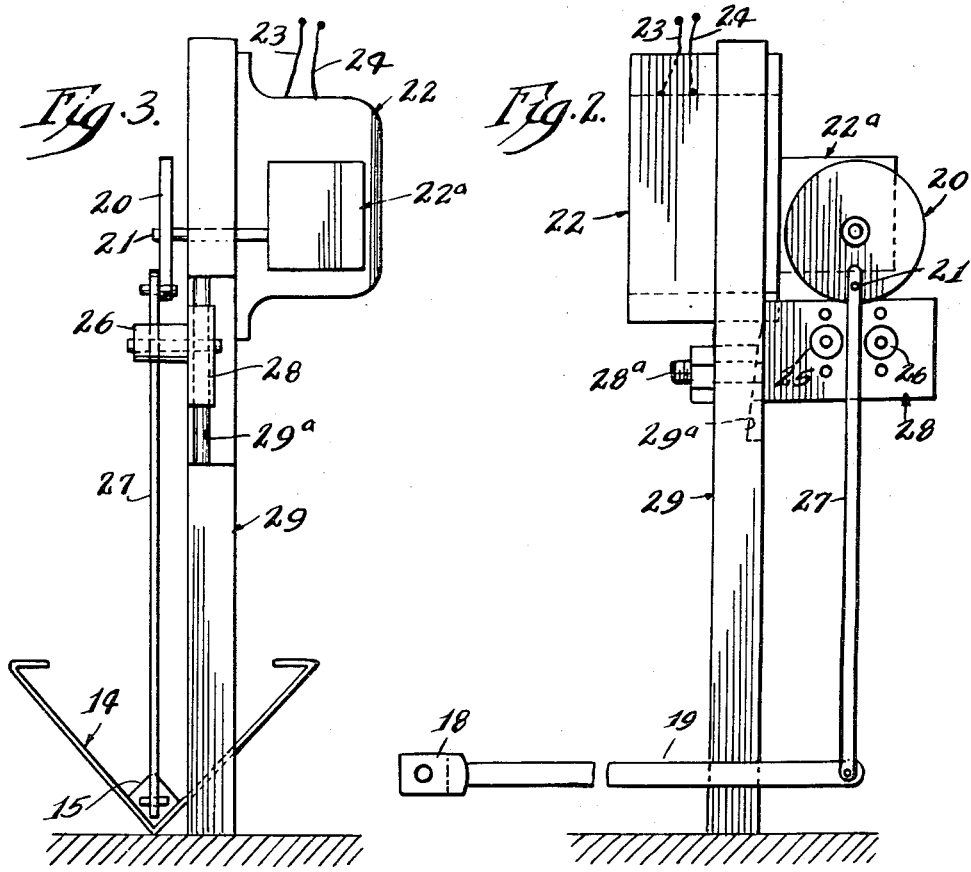
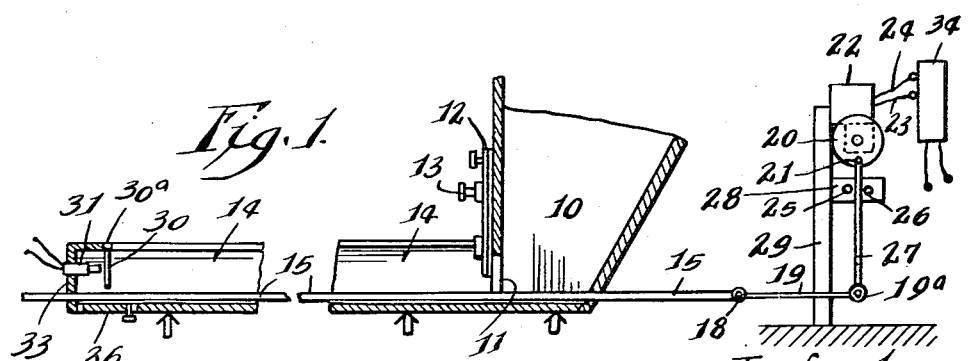
Inventor.
Nat Cordis.
By Everett A. Johnson
Attorney.

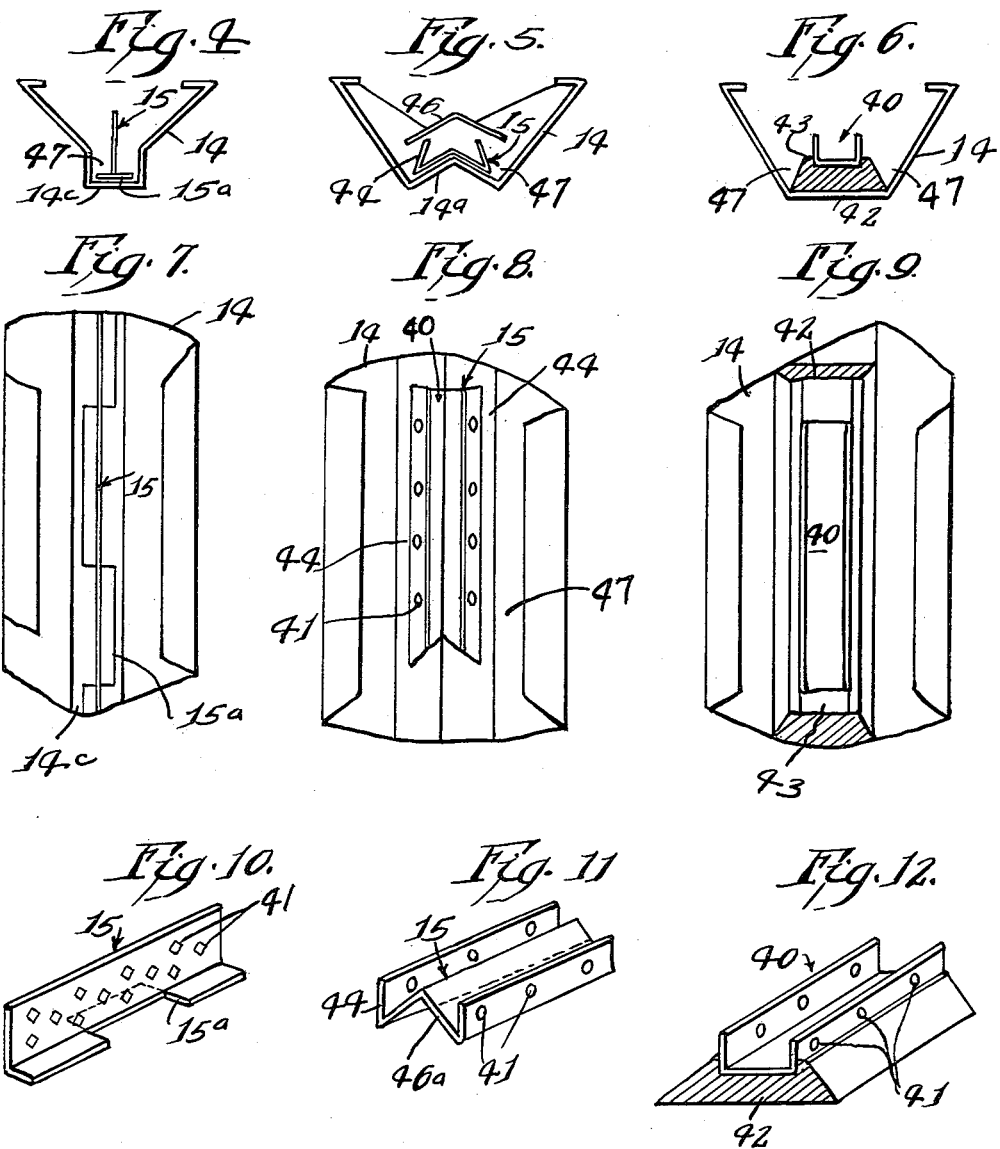

United States Patent Office 3,123,049
Patented Mar. 3, 1964

3,123,049
TROUGH FEEDER WITH RECIPROCATING IMPELLER
Nat Cordis, Crown Stock Farm, Silver Lake, Wis.
Filed May 31, 1961, Ser. No. 113,774
10 Claims. (Cl. 119—52)

This invention relates to conveyors for flowable solid materials and, more particularly, to a feeding device for distributing such materials along a trough accessible to stock and poultry. Still more specifically, the invention is an improvement in a method and means for automatically distributing feed in trough-type animal feeders.

The problem of controlled feeding of live stock, such as poultry, on a large scale necessarily involves much manual attention. It is, therefore, a primary object of this invention to provide a feeder in which the supply can be maintained with a minimum of attention. Another object is to provide a method and an automatic means for uniformly distributing an adequate supply of fresh feed within a flock feeder. A further object is to provide a feeder of rugged and yet inexpensive construction. These and other objects of the invention will become apparent to those skilled in the art as the description of my invention proceeds.

Briefly, the objects of the invention are attained by providing a trough means having a portion thereof in communication with a hopper and a conveyor member within the trough which is oscillated adjacent the bottom thereof with a speed differential in the to-and-fro movement. A drive means for the conveying member provides for reciprocation which has a slow advance and a rapid return stroke. On the delivery stroke the conveying member is moved slowly forward, carrying feed with it. On the return stroke the movement is two to four times faster and is rapidly pulled from under the advanced feed which remains in place by its inertia. Feed is discharged from the hopper into the trough at a controlled rate and withdrawal from the hopper is regulated by the rate at which the feed is advanced within the trough as determined by the conveying motion of the reciprocating bar which may have a stroke of from two to six inches, or longer as desired.

Further details of the invention will be described by reference to the accompanying drawings wherein:

FIGURE 1 is a schematic elevation, partly in section, showing the general assembly of parts;
FIGURE 2 is an enlarged elevation of the reciprocating drive unit forming a part of FIGURE 1;
FIGURE 3 is an enlarged end view of FIGURE 1;
FIGURES 4, 5 and 6 illustrate separate embodiments of the troughs and conveying members, showing a number of the shapes of cross section which they may take;
FIGURES 7, 8 and 9 are top views, respectively, of FIGURES 4, 5 and 6; and
FIGURES 10, 11 and 12 are perspective views of the reciprocated conveyor members shown respectively in FIGURES 4 to 6.

Referring to the drawings, a mass of flowable solids, such as poultry feed, is supplied from hopper 10 through a discharge port 11. At sliding gate 12 is held by a suitable means such as locking bolt 13, at a level to permit the desired rate of flow from the hopper 10 through the port 11 into the trough 14. This is usually somewhat in excess of that which the conveying member 15 can advance within the trough 14 so that there is a constant replenishing of the supply. In a typical installation, the trough 14 may be generally V-shaped, about 4.5 inches wide at the top, 2.75 inches deep, and provided with inwardly extending flanges about 0.375 inch wide.

The conveyor assembly, comprising the conveying member 15, is caused to move in a push-pull fashion within the trough 14 by a reciprocating power unit or assembly, a form of which is shown in the drawings.

One end of the conveying arm 15 is connected to the power unit by means of a pin and yoke 18 on the link 19. In FIGURES 1, 2 and 3, the walking beam 27 connects with a crank pin 21 on the driving plate 20 arranged to be rotated by a power source 22, which may be an electric motor, and transmission or gear reducer 22a, the motor 22 being supplied with electrical current through leads 23 and 24.

Fulcrum rollers or cams 25 and 26 are provided on opposite sides of the walking beam 27 and are supported by laterally projecting arm 28 carried by upright support 29. The walking beam may be about 0.25 inch wide and about 8 inches from crank pin to link 19; and the crank means has a crank arm of about 1 inch. The bumpers, which may suitably be rollers, are spaced about 0.75 inch from each other and about 1.75 to 2.0 inches from the center of rotation of the crank means.

As the crank means, comprising for example the drive plate 20 and the crank pin 21, is rotated, the beam 27 slides longitudinally downward between the bumpers 25 and 26 until the lowest point is reached at which time the beam 27 pivots momentarily about the bumper 25 and draws the conveyor member 15 rapidly rearwardly. On the balance of the clockwise rotation of the crank pin 21, the lower end of the beam 27 and the lateral link 19 move the member 15 slowly forward through the trough 14 to advance the feed which is deposited in its advanced position by its inertia when the member 15 is jerked back as described.

The vertical spacing of the pair of bumper cams or roller fulcrums 25 and 26 below the shaft on which the crank means is rotated determines the relative speeds of the advancing and return strokes of the conveying member 15. The lateral spacing of the fulcrums 25 and 26 with respect to the shaft also adjusts the length of the stroke of 15 and the relative speeds of the two strokes. The projecting arm 28, supporting the rollers 25 and 26, can be vertically and laterally adjusted by means of the threaded pin 28a which holds the tapered end of the arm 28 in the tapered slot 29a in the upright 29.

Upon the return stroke of the arm 15, the rapid travel causes the rod 15 to slide under the feed advanced within the trough 14 by the previous "push" or slow delivery stroke of the arm 15. This cycle is repeated at a rate of from about 30 to 50 strokes a minute with feed being supplied to the inlet end of the trough 14 by suitable means such as a hopper 10. As illustrated, this is done by gravity flow through the port 11 below the adjustable gate. When the feed already discharged from the port 11 is moved down the trough, more feed comes in to take its place but it does not continue to discharge if the feed piles up in front of port 11, i.e., when the conveying member is at rest.

Until the trough is filled to the desired extent, the conveying arm 15 continues to oscillate within the trough 14 (and along the bottom of the hopper 10), bringing feed from the hopper into the trough and advancing feed from the inlet end of the trough to the terminal end. Finally, the advanced feed reaches and piles up against the hinged switch-actuating end plate 30.

The weight of the hinged plate 30 at the end of the trough 14 is sufficient to hang vertically but when feed is pushed against it by the reciprocated conveyor assembly, the plate swings toward the end of the trough 14 and depresses switch 31. This switch may suitably be of the spring-loaded micro-type and is in the lead 24 or 23 to motor 22 or operates an independent on-off switch (not shown) which controls the actual power to the motor 22.

Movement of the plate 30, in any event, cuts off the power thereby automatically stopping the motor 22 and hence the push-pull action of the conveying member 15. A timer 34 controls the power source to the motor 22 to run the motor at selected intervals for selected periods. However, the switch 31 over-rides the timer 34 as described above during the feeding period and stops the conveyor member when the trough 14 becomes filled to the desired level or extent.

If it is desired to by-pass the switch 31 for any reason, it is merely necessary to swing the plate 30 upwardly about its hinge 30a and out of the path of the feed. This may be done, for example, when it is desired to remove all feed from the trough 14, by opening the trap door 36 and by closing port 11. It may be desired to have several trough units in series fed from a single hopper. In that event, the door 36 remains open and the feed advanced in the trough 14 is discharged onto the inlet end of another trough unit similar to trough 14 described above. The switch plate 30 on the first unit trough is lifted to by-pass the switch 31 but a corresponding plate and switch on the final trough unit or section in the series controls the reciprocating power unit.

A plurality of agitator fingers, upstanding or lateral, may be provided on the portion of the conveying member which operates within the hopper 10 to avoid any tendency of the feed to bridge. The free end of the member 15 extends through a slot in the end wall 33 of the trough 14, the slot serving as an end guide for the reciprocating member 15. Alternatively, a sleeve (not shown) may be fixed to the bed of the trough near the terminal end to receive the reciprocating end of the arm 15. Other hold-downs can be devised by those skilled in the art.

Referring to FIGURES 4 to 12 of the drawings, the trough 14 is V-shaped and the conveying member 15 may be in one of the forms shown. Whatever its form, it operates within the trough out of the way of the feeding poultry and can be adapted for use in existing feeding trough designs. Since it is in the trough, it rides on or is in the feed, making for silent operation.

Referring to FIGURES 4 to 12 of the drawings, the trough is V-shaped in FIGURE 4, W-shaped in FIGURE 5, and flat bottomed in FIGURE 6. The conveying member 15 may be a flat strip of expanded metal with laterally extending tabs 15a as in FIGURE 4; W-shaped sub-trough as in FIGURE 5; or a U-shaped sub-trough as in FIGURE 6.

In FIGURE 6 the conveying member 15 comprises a generally U-shaped trough 40 with delivery openings 41 in the upstanding walls through which the travelling feed falls into the main trough. When the proper level is reached in the trough 14 as determined by the height of the holes, the feed moves along within the trough 40 which is reciprocated with a slow advance and rapid return stroke as described for the other conveying members 15.

In FIGURES 4, 7 and 10 the strip 15 is perforate such as an expanded metal sheet with tabs 15a supporting the strip and running in channel 14c in the bottom of the V-shaped trough 14.

In most examples the conveying member 15 is shown as resting on the floor of the trough 14. However, it is contemplated that the member 15 may be operated within a channel in the bottom of the trough, or on a riser 42, preferably with a guide channel 43 to accommodate the reciprocating member 40. Likewise, the drive unit may comprise a pair of tandem solenoids, a driven cam and spring, pneumatic or hydraulic drives with quick spring returns, etc. These and other modifications of apparatus components and equivalent elements can be used in the apparatus without departing from the spirit of the invention.

In accordance with my invention, a feeding trough is provided with an open-topped conveyor member within the trough. Poultry may feed from the trough and from the conveying member. A hopper is in communication with a portion of the conveyor member which may comprise a generally U-shaped delivery trough 40 with delivery openings 41 in the upstanding walls and through which the conveyed feed discharges into the feeding trough 14. When the proper level of feed is accumulated within the feed trough 14, the feed no longer discharges from the delivery trough 40 into the feed trough but is moved along the delivery trough 40 to another point of discharge. The level of feed within the feeding trough 14 is determined by the height of the openings 41.

In FIGURES 5, 8 and 11 of the drawings, the delivery member 15 is a generally W-shaped sub-trough. The side walls 44 thereof, having ports 41 therein, form parallel distribution channels 47 on each side of member 15 in the feeding trough 14. The channel or delivery member 15 has an upwardly concave bottom 46a which conforms to the bottom 14b of the trough 14. When reciprocated, the feeding action is as described with respect to the other embodiments.

If desired, a shield 46 may be provided to deflect debris from the sub-troughs 47 of FIGURES 5 and 6.

In FIGURES 6, 9 and 12 of the drawings, the delivery trough 40 is supported by the riser 42 and operates within the guide channel 43. The height of the riser 42 governs the depth of the feed within the main feeding trough 14.

The delivery members 40 and 45 are oscillated in a to-and-fro movement with a speed differential. Thus, a drive means reciprocates the delivery trough or channel in a slow advancing stroke and a rapid returning stroke. On the advancing stroke, the delivery member 40 or 45 is moved slowly forward carrying feed with it. On the return stroke, the delivery member may move two to four times as fast as the advancing stroke so that the delivery member is rapidly pulled from under the advanced feed, which remains in place by its inertia.

The advanced feed continues to advance until it reaches a delivery port or opening 41, which is not blocked by accumulated feed within the feeding trough 14. As the feed is eaten by the poultry, the accumulated feed is replenished by discharge from the openings 41 as the delivery trough 40 reciprocates.

It will be understood that, although the invention has been described with respect to a single trough, it is contemplated that sections of trough is closed circuit may be provided with a conveyor member 15 in each flight of the trough 14. Such trough sections may be parallel with a U-bend trough at the remote end. The conveyor members are reciprocated in unison, being linked, for example, by a cross lever which is centrally pivoted between the trough sections and at its ends to the adjacent ends of the conveyor member. Flexible cable connectors running over pulleys may also be used. Reciprocation of one end of the conveyor member as described effects flow of solids in series through the series trough sections. Likewise, the parallel troughs may be unitary, taking the form of a trough which is W-shaped in cross section with a conveyor rod running in each valley of the trough.

This application is a continuation-in-part of my now abandoned co-pending application Serial No. 376,591, filed August 26, 1953, entitled "Chicken Feeder With Reciprocable Conveyor."

What I claim is:

1. A conveyor system for flowable solids comprising in combination, a trough means, a reciprocable conveyor member comprising a shallow narrow trough supported within said trough means, said member having side walls, and a plurality of discharge ports longitudinally spaced along said side walls and adapted to be closed by deposited solids accumulated to the desired depth in said trough means.

2. The conveyor system of claim 1 which includes feed-responsive switch means in said trough means and controlling the actuation of the said conveyor member.

3. The feeder of claim 1 wherein the reciprocable conveyor comprises a sub-trough accessible to stock.

4. The feeder of claim 3 wherein the sub-trough is W-shaped in cross-section.

5. The feeder of claim 4 wherein the sub-trough has outwardly and downwardly sloping side walls forming a pair of distribution channels with the walls of said trough means and a longitudinal solids conveying channel between the said sloping side walls, said distribution ports being in said sloping side walls.

6. In a poultry feeder comprising a distribution trough means to which poultry have access, the improved conveyor system in said trough means comprising an open-topped supply channel means supported within and substantially throughout the length of said trough means, said supply channel means having upstanding wall portions with a plurality of discharge ports therein, said discharge ports being longitudinally spaced along said supply channel and trough, any given port being adapted to be closed by the accumulation of feed in said distribution trough means adjacent said supply channel means, and means for moving feed along said channel, the feed so moved in said channel being supplied to said trough means through said ports, feed flowing through said ports into said trough means until feed accumulates adjacent said ports within said trough means to a depth sufficient to seal a given port thereby causing the feed advancing in said channel to by-pass such port.

7. The conveyor system of claim 6 wherein the supply channel is supported within said trough along its bottom by a riser on the bottom of the distribution trough and wherein the means for moving feed along said supply channel comprising means for reciprocating said supply channel slowly forward to advance the feed and quickly rearward to leave the feed in its advanced position, the advancing feed moving along the channel from port to port until discharged from the supply channel into the distribution trough.

8. A stock feeder comprising an elongated distribution trough means comprising a portion to which stock have access, hopper means astride and discharging into said trough means, feed level control means between said hopper and said portion, a rigid conveyor member in said trough means, said conveyor member extending within the access portion of said trough and being greater in length than said access portion, feed transfer ports in said member permitting lateral flow of feed as well as longitudinal flow of feed in said trough means, and feed-responsive switch means in said trough means remote from said hopper means, said feed-responsive means controlling operation of said conveyor member.

9. The feeder of claim 8 wherein the conveyor comprises an upstanding perforate strip member.

10. The feeder of claim 9 wherein the trough is generally V-shaped with a flat channel bottom and said strip is provided with lateral foot tabs running on the bottom of said channel.

References Cited in the file of this patent

UNITED STATES PATENTS

| | | |
|---|---|---|
| 2,043,595 | Raymond | June 9, 1936 |
| 2,738,766 | Hart | Mar. 20, 1956 |
| 2,785,792 | Cordis | Mar. 19, 1957 |